(12) United States Patent
Guan (10) Patent No.: US 8,383,176 B2
(45) Date of Patent: Feb. 26, 2013

(54) HAN-BURGER AND MAKING METHOD THEREOF

(76) Inventor: Guang Hui Guan, Temple City, CA (US)

( * ) Notice: Subject to any disclaimer, the term of this patent is extended or adjusted under 35 U.S.C. 154(b) by 227 days.

(21) Appl. No.: 12/386,373

(22) Filed: Apr. 17, 2009

(65) Prior Publication Data

US 2010/0266729 A1    Oct. 21, 2010

(51) Int. Cl.
*A21D 13/00* (2006.01)
(52) U.S. Cl. .......... 426/138; 426/94; 426/283; 426/512; 426/549
(58) Field of Classification Search .................. None
See application file for complete search history.

(56) References Cited

U.S. PATENT DOCUMENTS

| 3,950,563 | A | * | 4/1976 | Wheaton | 426/505 |
| 4,656,935 | A | * | 4/1987 | Kukura | 99/426 |
| 4,725,444 | A | * | 2/1988 | Wilkins | 426/280 |

* cited by examiner

*Primary Examiner* — Lien Tran
(74) *Attorney, Agent, or Firm* — Raymond Y. Chan; David and Raymond Patent Firm (57) ABSTRACT

A method of preparing a han-burger includes the steps of: providing a dough of the han-burger; shaping a first portion of the dough to form a burger shell having a filling compartment and a top opening, and a second portion of the dough to form a burger cover having a size and shape geographically matching the top opening of the burger shell; applying heat to the burger shell and the burger cover to retain the shapes thereof; preparing a filling with predetermined ingredients and nutrition, wherein the filling is disposed in the filling compartment of the burger shell; and covering the burger cover at the top opening of the burger shell to enclose the filling within the filling compartment.

11 Claims, 7 Drawing Sheets

HAN-BURGER AND MAKING METHOD THEREOF

BACKGROUND OF THE PRESENT INVENTION

1. Field of Invention

The present invention relates to a food product, and more particularly to a han-burger product with filling for containing variety kinds of stuffing therein.

2. Description of Related Arts

Broadly, the bun or crust usually made by variety kinds of dough and added different ingredients into the dough for different softness, tastes, or baking purposes. Traditionally the crust is prepared for containing filling within the crust, such as a pastry shell, bread crust, pie crust, or tart crust. Thus, the crust is able to be enjoyed with the variety of fillings or stuffing to form different kinds of food product, such as apple pie filled apple in the crust, crust with creamy chowder soup, or Asian style bread, such as bread crust with barbecue pork and soupy sauce.

In order to seal the stuffing within the crust, the stuffing is normally prepared and sealed into an original material of crust to form an integral bun product. For example, a stuffing of apple mix is usually filled within containing dough, then sealed by top sealing dough to seal the apple mix within the containing and top sealing dough, and then put it into an oven for baking the dough of the original material of crust and the stuffing of apple mix together, so as to form an integral apple pie. The apple pie can be served immediately once the apple pie is baked, or can be further packed to form a frozen product for later selling.

Some problems are frequently encountered in the process for preparation of the bun product. During baking a filled crust or shell product, the contact of moist stuffing with the surface of the original material such as dough, tends to absorb the moisture in the filling of stuffing. Moreover, the stuffing underlying the original material of the crust may remain undesirably moist and be undercooked. As a result of the contact between the moist stuffing and the surface of dough makes the contact surface of dough becomes tough and soggy, which is a main concern of the drawback of the existing bun product.

Mostly, the original material of crust or shell of the bun product, such as flour, starch, or dough, is heated by putting a layer of the original material of crust into a cavity of mold, so as to form a compartment shape within the original material for containing the stuffing therein. While heating the crust original material within the mold, the compartment surface of the crust is aroused, and becomes uneven and/or has some bubbles protruded out from the compartment surface. Thus, the phenomena not only shrinks the compartment containing space, but also undesirably arises the contact surface between the dough surface and the stuffing, so as to undesirably make the crust relatively more soggy.

In order to allow a user to conveniently and quickly enjoy the bun products anytime he or she wants, there are plenty of frozen crusts products are provided for the user to store it in their own freezer, and conveniently and quickly heat it up whenever they want. For making the frozen crusts products, lots of manufactures heated or cooked the crusts products filled with the stuffing in advance, then frozen and packed the cooked bun product for selling purpose.

However, after the contact between the dough surface and the stuffing while heating the bun product, and freezing and packing the bun product with the filled stuffing therein, the bun products tend to be even more undesirably soupy and tough.

SUMMARY OF THE PRESENT INVENTION

A main object of the present invention is to provide a hamburger and the process thereof, which provides a new way to have Chinese food that enables the consumer to have Chinese favor food encased in a burger shell and a burger cover of the han-burger.

Another object of the present invention is to provide a han-burger and method thereof, wherein the burger shell has a filling compartment to contain the filling in the burger shell, while the burger cover is adapted to cover at the top opening of the burger shell to enclose the filling within the filling compartment.

Another object of the present invention is to provide a han-burger and method thereof, wherein the burger shell and the burger cover are pre-cooked to form a hardened surface for contacting with the filling so as to minimize the undesired moisture of the crust original material surface.

Another object of the present invention is to provide a han-burger and method thereof, wherein the burger shell and the burger cover are made from bread to have an innovation way for the consumer to eat the Chinese food with bread.

Another object of the present invention is to provide a hamburger and method thereof, wherein the filling of the han-burger is separately packed to avoid or decrease the undesirable moisture of the crust surface.

Another object of the present invention is to provide a han-burger, wherein the burger shell is heated with a shell mold having an inner surface to define a filling compartment therein, wherein the convex molding surface of the shell mold is adapted to retain the shape of the filling compartment of the burger shell for preventing the undesirable uneven surface with the compartment surface of the burger shell while heating the han-burger.

Accordingly, the hamburger of the present invention provided by the making method thereof, comprises:

a burger unit, which comprises a burger shell to define the filling compartment therewithin, and a burger cover provided for enclosing the filling compartment by contacting a circumferential edge of the burger cover and an inner surface of the filling compartment; and a filling, wherein the filling is adapted for being received in the filling compartment of the burger shell of the burger unit, and being enclosed in the filling compartment by covering the burger cover at a top opening of the filling compartment to form the han-burger.

Accordingly, a making method for preparing the han-burger comprises the steps of: (a) providing a dough of the han-burger; (b) shaping a first portion of the dough to form a burger shell having a filling compartment and a top opening, and a second portion of the dough to form a burger cover having a size and shape geographically matching the top opening of the burger shell; (c) applying heat to the burger shell and the burger cover to retain the shapes thereof, (d) preparing a filling with predetermined ingredients and nutrition, wherein the filling is disposed in the filling compartment of the burger shell; and (e) covering the burger cover at the top opening of the burger shell to enclose the filling within the filling compartment.

These and other objectives, features, and advantages of the present invention will become apparent from the following detailed description, the accompanying drawings, and the appended claims.

DETAILED DESCRIPTION OF THE PREFERRED EMBODIMENT

Figure 1:
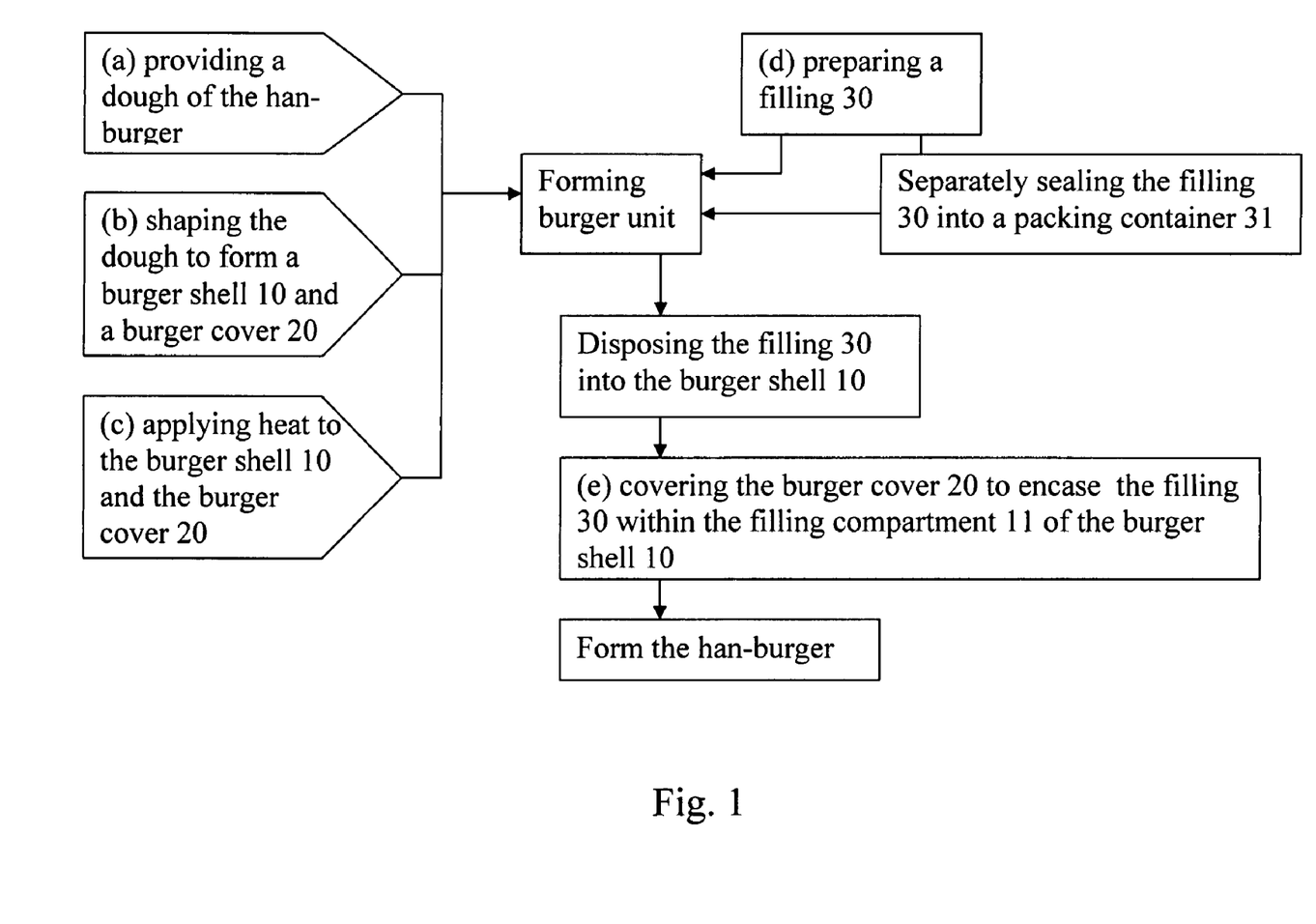
FIG. 1 is a flow chart illustrating the method of preparing a han-burger with filling according to a first embodiment of the present invention.
Figure 2:
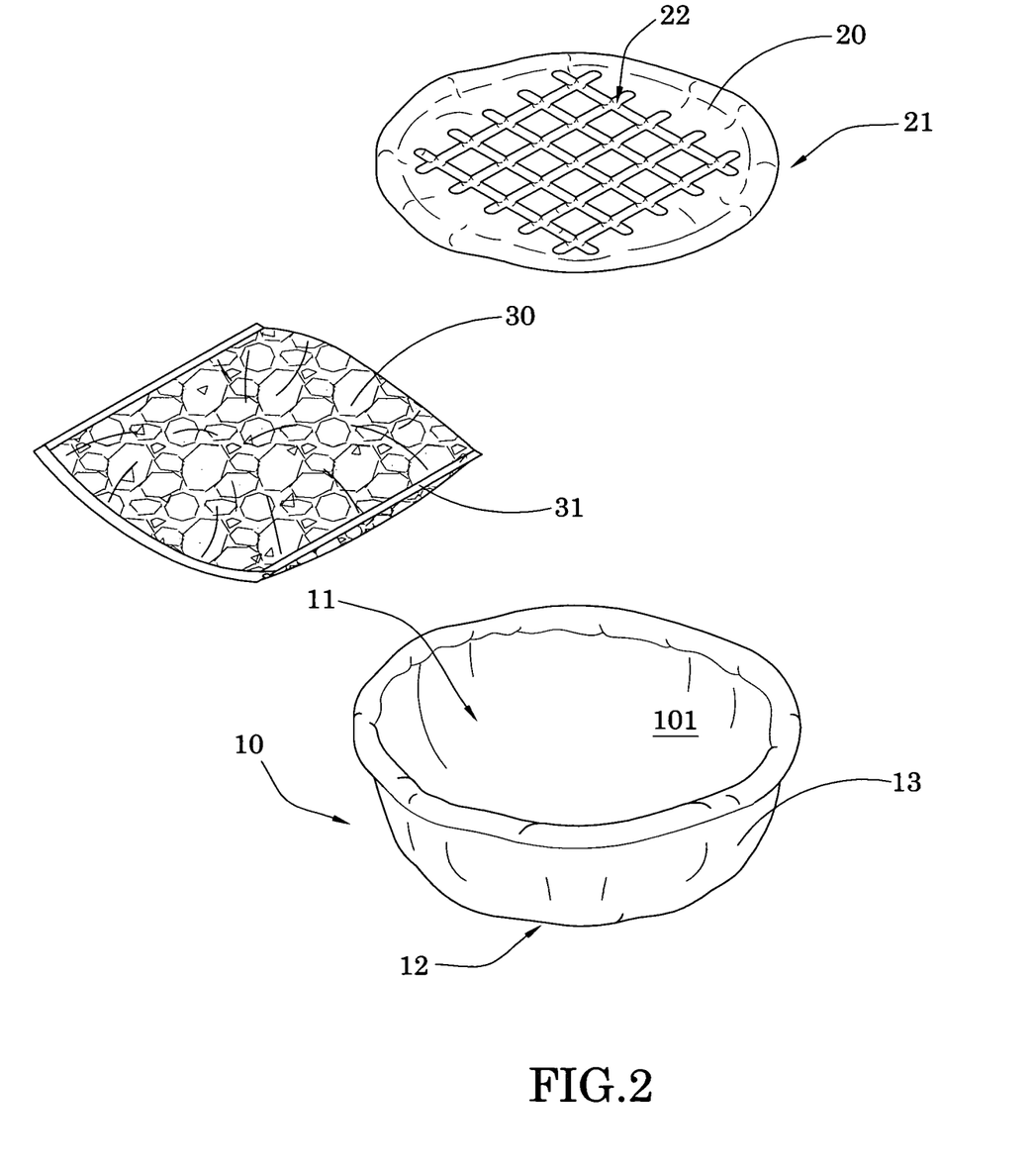
FIG. 2 is a perspective view of the han-burger with filling according to the above first preferred embodiment of the present invention.
Figure 3:
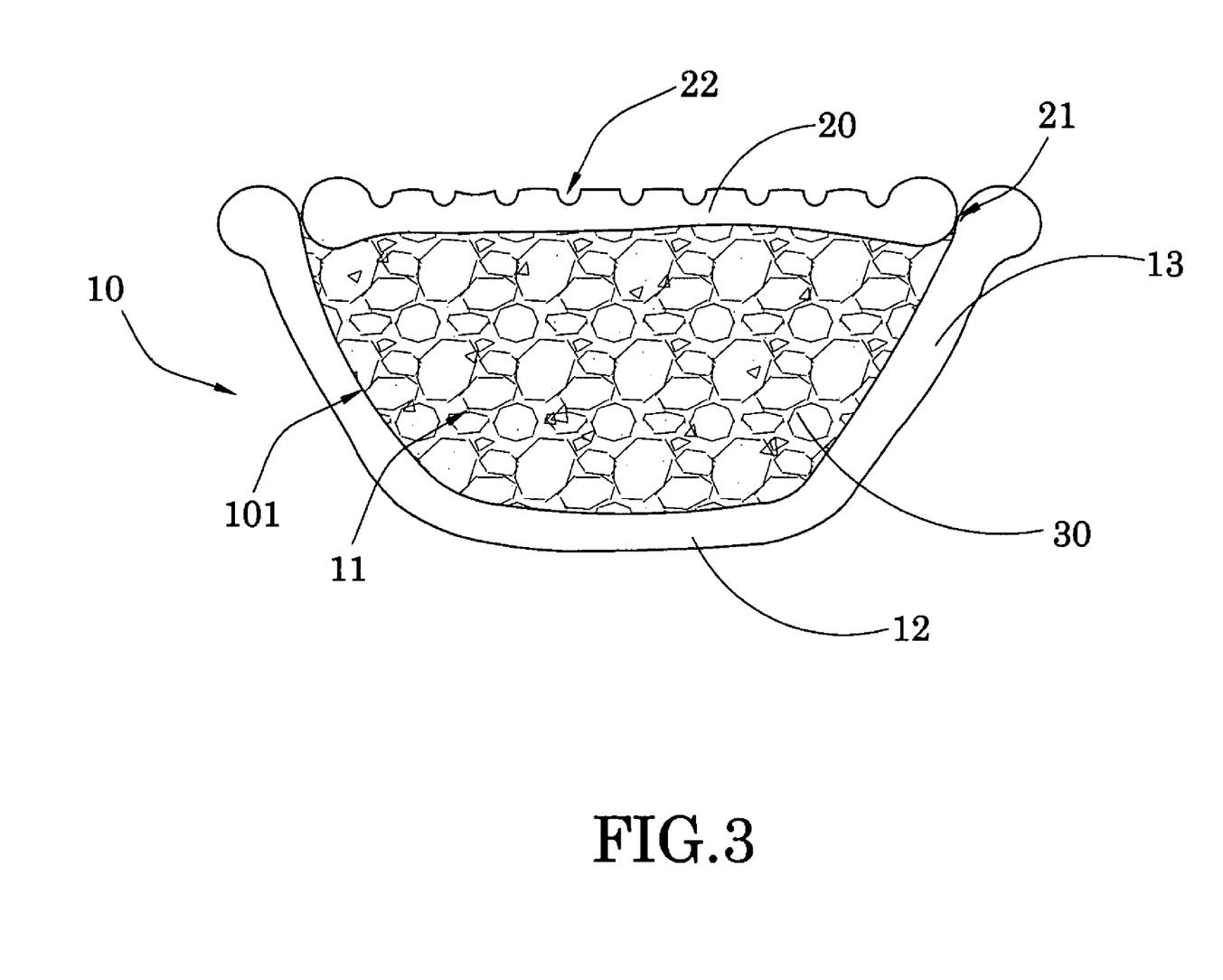
FIG. 3 is a sectional view of the han-burger with filling according to the first preferred embodiment of the present invention.

Referring to FIGS. 1 to 3 of the drawings, a han-burger according to a first preferred embodiment is illustrated, wherein the hamburger comprises a burger unit and a filling 30 with predetermined ingredients and nutrition. Accordingly, the burger unit comprises a burger shell 10 having a filling compartment 11 and a top opening, and a burger cover 20 having a size and shape geographically matching the top opening of the burger shell 20. The filling 30 is disposed in the filling compartment 11 of the filling shell 10, wherein the burger cover 20 is covered at the top opening of the burger shell 10 to encase the filling 30 within the filling compartment 11.

Accordingly, a traditional hamburger consists of a cooked ground beef sandwiched between two pieces of burger buns, wherein the hamburgers are often served with various condiments such as ketchup, mustard, or relish, as well as lettuce, tomato, onion, and cheese. However, the ground beef, condiments, and tomato are juicy and watery to leak out from the burger buns and to make the burger buns soggy. The present invention provides an innovative way that the burger shell 10 has the filling compartment 11 to retain the filling 30 thereat while the filling 30, especially the Chinese food, can be encased within the burger unit.

FIG. 1 illustrates the making method of the burger unit, which comprises the following steps.

(1) Provide a dough of the burger unit of the han-burger.

(2) Shape a first portion of the dough to form the burger shell 10 having the filling compartment 11 and the top opening, and a second portion of the dough to form the burger cover 20 having a size and shape geographically matching the top opening of the burger shell 10.

(3) Apply heat to the burger shell 10 and the burger cover 20 to retain the shapes thereof.

The dough of raw material of burger unit has at least one ingredient mixed with the dough for different purposes, such as adding yeast for baking purpose, sugar, salt, butter, different types of flours etc. Kneading the mixture of dough may be applied to make the hamburger has a relatively better quality.

As shown in FIGS. 2 and 3, the burger shell 10 has a bottom wall 12 and a surrounding wall 13 inclinedly extended from the bottom wall 12 to define the filling compartment 11 therewithin, wherein the bottom wall 12 and the surrounding wall 13 are integrally formed an inner surface 101 of the burger shell 10 within the filling compartment 11 as the surrounding surface of the filling compartment 11. As shown in FIG. 3, the burger shell 10 has a trapezoid cross section that the surrounding wall 13 is a flat wall inclinedly extended from the bottom wall 12 to form the enlarged top opening of the burger shell 10.

The burger cover 20 has a circumferential edge 21 having a shape and size geographically matching the top opening of the filling compartment 11, which is adapted for enclosing the filling compartment 11 by frictionally contacting the circumferential edge 21 of the burger cover 20 with the inner surface 101 of the burger shell 10.

It is worth mentioning that the inclinedly extended surrounding wall 13 of the burger shell 10 is able to retain the burger cover 20 in a position at the top opening of the filling compartment 11, while the circumferential edge 21 of the burger cover 20 is contacting with the inner surface 101 of the surrounding wall 13 of the burger shell 10, so as to prevent the burger cover 20 downwardly sliding movement to fall into the filling compartment 11. In other words, when the burger cover 20 is downwardly pressed at the top opening of the burger shell 10, the circumferential edge 21 of the burger shell 20 will slide at the surrounding wall 13 of the burger shell 10 until the burger cover 20 is frictionally engaged with the burger shell 10 to enclose the filling 30 within the filling compartment 11.

In order to retain the shape of each of the burger shell 10 and the burger cover 20, the step (2) further comprises the following steps.

Figure 7:
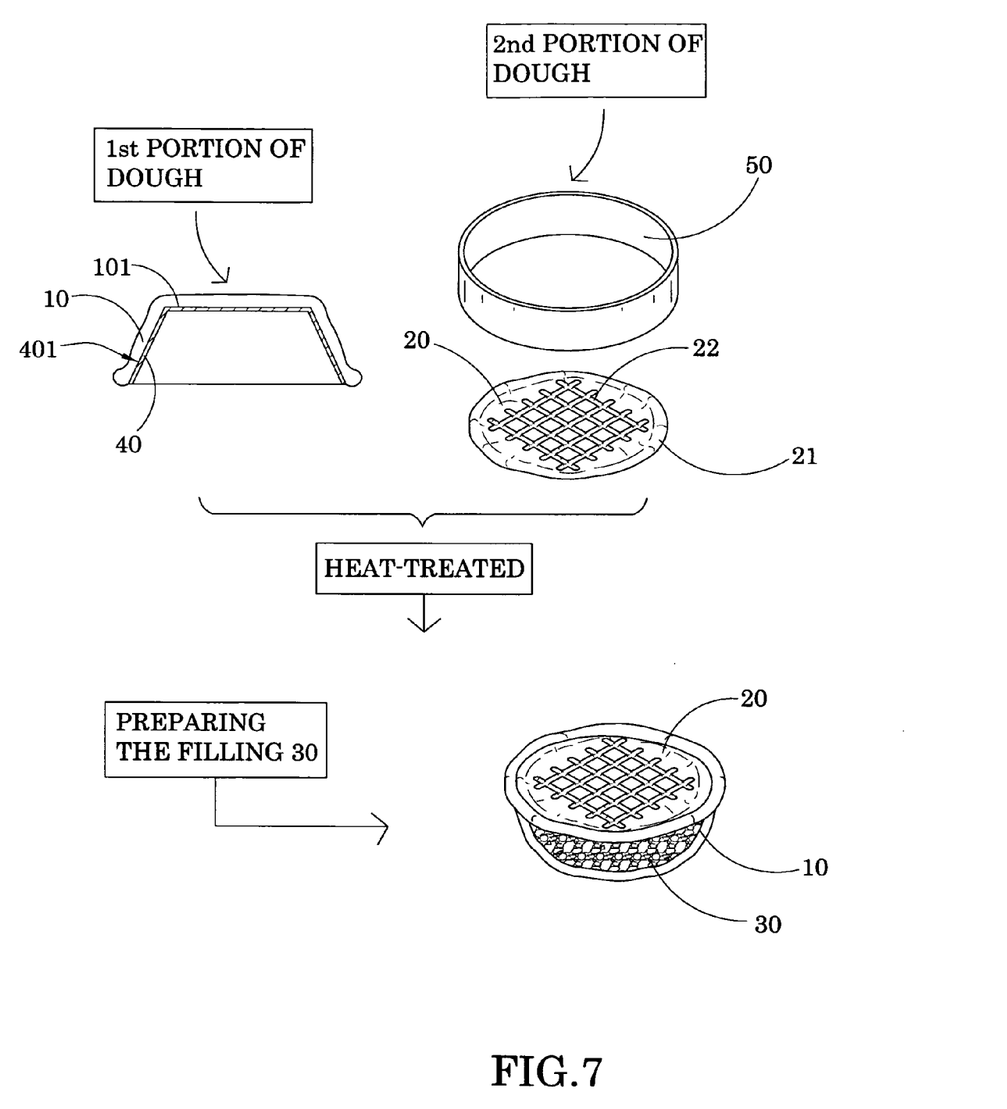
FIG. 7 is a schematic view of the han-burger according to the present invention, illustrating the method of preparing the han-burger.

(2.1) putting the first portion of the dough at a shell mold 40 which has a convex shape and defining a convex molding surface 401 thereon, wherein the shell mold 40 is adapted for retaining the shape of the first portion of the dough and shaping the first portion of the dough into the shape of the burger shell 10 having the filling compartment 11 therewithin.

(2.2) putting the second portion of the dough at a cover mold 50 to retain the shape of the burger cover 20 to retain the size and shape geographically matching the top opening of the burger shell 20.

According to the step (2.1), the shell mold 40 has a cavity shape to form the convex surface 401 for holding and remaining a shell shape of burger shell 10 having the filling compartment 11 therewithin. In stead of putting the first portion dough into an inner cavity surface of a cavity of the shell mold 40, the present invention prefer to turn the cavity shape shell mold 40 up side down to hold and shape the first portion of the dough by the convex surface.

It is worth mentioning that shaping the burger shell 10 by contacting the inner surface 101 of the burger shell 10 with the convex surface 401 of the shell mold 40 can effectively prevent an undesirably irregular shape of the inner surface 101 of the burger shell 10 while applying heat on the burger shell 10, due to the fermentation of the dough of the burger shell 10, so as to prevent the irregular surface happening or shrinking a space of the filling compartment 11.

It is appreciated that the irregular shape of the inner surface 101 of the filling compartment 11, such as bubbles, may not only shrink the filling compartment 11 containing space, but also undesirably arise the contact surface between the dough surface of the filling compartment 11 and the filling 30, so as to undesirably make the burger unit of the han-burger relatively more soggy.

The cover mold 50 is further provided for shaping the second portion of the dough to form the burger cover 20. The cover mold 50 has a peripheral shape having a size and shape geographically matching the shape of the top opening of the filling compartment 11, in such a manner that the cover mold 50 is able to shape the second portion of the dough into the burger cover 20 for contacting the circumferential edge of the burger cover 20 with the inner surface 101 of the burger shell at the top opening of the filling compartment 11.

For applying variety of sauces on the hamburger as the user desired, the step (2) further comprises a step of forming a plurality of indented cavity 22 on a top surface of the burger cover 20, wherein the indented cavity 22 is capable of receiving and retaining the variety of sauces thereon, such that the user can add more flavor on the indented cavities 22 and prevent the overflowing of the sauce. It is worth mentioning that the indented cavities 21 has a variety of shapes, in the first embodiment of the present invention is embodied as a plurality of indented grooves crossing each other to form a continuity indented cavities 22 for receiving the sauce. The formed indented cavity 22 is being heat-treated on the step (3) for retaining the shape thereon.

After shaping the wanted shape of the burger shell 10 and the burger cover 20, the heat is further applied on the burger shell 10 and the burger cover 20 for remaining the shape thereof, as described step (3). The heat applied on the burger unit of the han-burger also makes the inner surface 101 and an outer surface of the burger shell become harden, so that a harden layer occurred on the inner surface 101 and outer surface of the burger shell 10 can decrease the undesirable soggy or soupy happened between the contact of the filling 30 and the inner surface 101 of the filling compartment 11.

Accordingly, the heat applied onto the burger unit not only makes the harden surface of the burger unit, but also pre-cooks the burger unit to a predetermined cooked level by controlling the heating temperature and the time. Thus, the burger unit can be cooked until it half-done just for make the harden surface of the burger unit, so that the user is able to further cook the han-burger when the user is about to eat and turn the burger unit into an edible product. The heat also can be applied on the burger unit until the burger unit is fully cooked to the edible product for enjoying the han-burger immediately, or for storing the han-burger for later use.

The heat can be supplied by an oven for baking purpose, so that the burger shell 10 and the burger cover 20 are placed into the oven at a predetermined baking temperature for a predetermined baking time, such as 400° C. baking temperature for 10 minutes. It is worth to mention that the burger shell 10 should be placed on the shell mold 40 during baking process to retain the inner surface 101 of the burger shell 10. Moreover, the heat can also be supplied by a steam chamber, wherein the burger unit of the han-burger is placed into the steam chamber at a predetermined temperature for a predetermined time, so as to turn a surrounding surface of the surrounding wall 13 of the burger shell 10 become harden.

Before the step (3) of applying heat, a step of coating an edible material on the inner surface 101 of the burger shell 10 within the filling compartment 11 and/or on the outer surface of the burger shell 10, such as brushing egg protein portion or oil on the surface of the burger unit to provide a protective layer, so as to prevent the unwanted moisture occurred between the contact of filling 30 and burger unit.

In order to make the han-burger with the filling 30 therein, the method further comprises the following steps.

(4) Prepare the filling 30 with predetermined ingredients and nutrition, wherein the filling 30 is disposed in the filling compartment 11 of the burger shell 10.

(5) Cover the burger cover 20 at the top opening of the burger shell 10 to enclose the filling 30 within the filling compartment 11.

Accordingly, the filling 30, preferably the Chinese food, is prepared to be encased within the burger shell 10 and the burger cover 20. The filling 30 is further separately prepared for stuffing or being received in the filling compartment 11 of the burger shell 10, wherein the filling 30 is mixed with a predetermined edible material, flavor, or other predetermined ingredients and nutrition. After prepared the filling 30, the filling 30 can be disposed into the filling compartment 11 after the heat is applied on the burger unit for being served. The burger cover 20 further is covering the filling compartment 11 of burger shell 10 at the top opening of the filling compartment 11, so as to form the han-burger. It is worth to mention that even though the filling 30 is juicy and watery, the filling 30 will not leak out of the burger shell 10 with its physical structure.

In the step (4) of preparing the filling 30, the prepared filling 30 is capable of being sealed into a packing container 31, such as a sealing bag, so that the user can open the packing container 31 for disposing the filling 30 into the filling compartment 11 of the burger shell 10 later when the user is about to enjoy the han-burger. Thus, the separated packing of filling 30 is able to prolong the preserving period of the han-burger, and decrease the undesirably contact time between the filling 30 and the burger unit of the han-burger.

Therefore, the filling compartment 11 of burger shell 10 received the filling 30 therewithin and being covered by the burger cover 20 to enclose the filling 30 in the filling compartment 11 is formed the han-burger. The han-burger is able to be served immediately after the cooked the burger unit and disposed the filling 30 into the filling compartment 11 of the burger shell 10.

Figure 6:
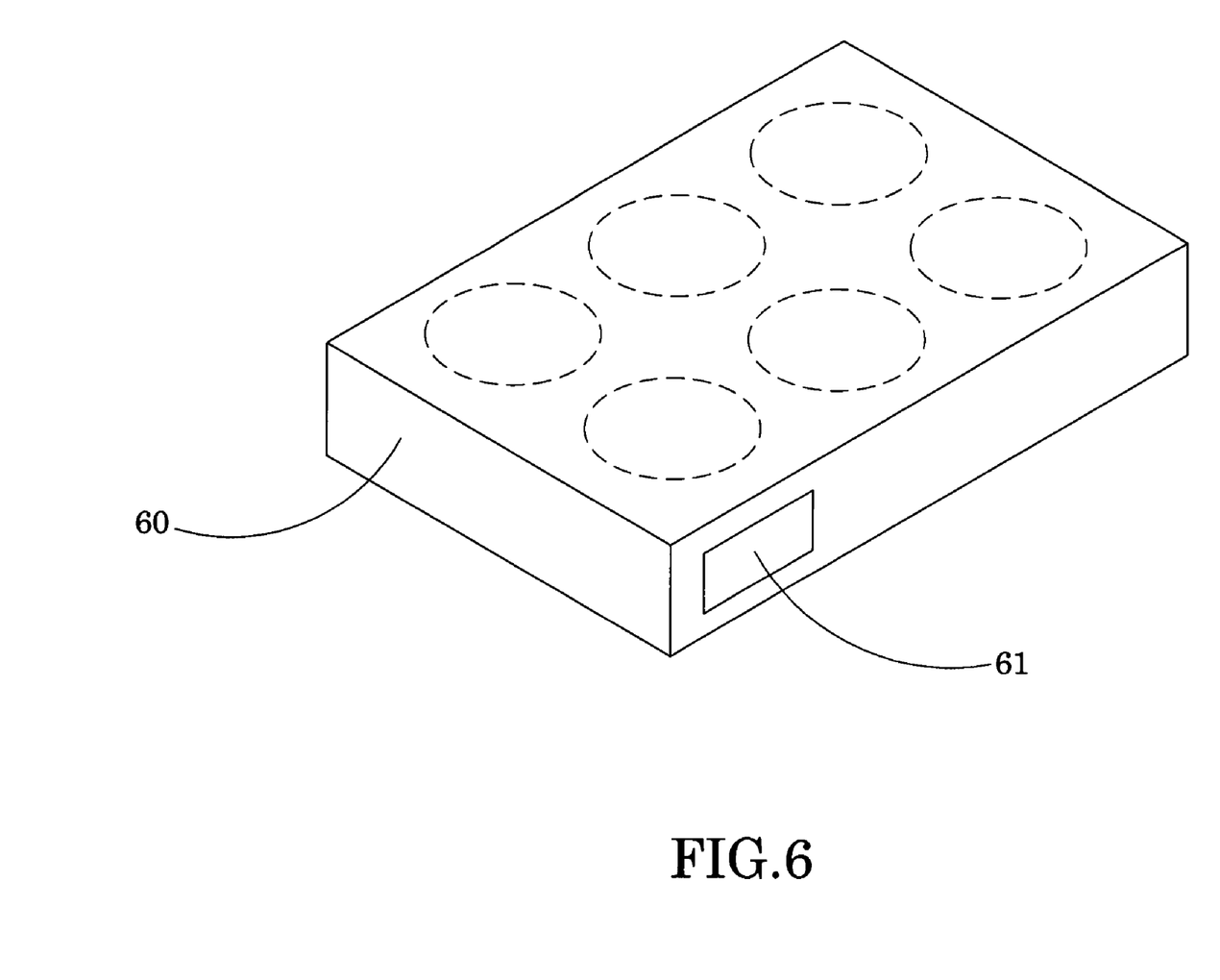
FIG. 6 is a perspective view of the han-burger according to the present invention, illustrating the han-burger, as a frozen food, being packed into a box.

On the other hand, the hamburger is able to preserved, such as freeze the han-burger as a frozen food, as shown in FIG. 6, so that the user is able to enjoy the han-burger by easily heating up the han-burger. As the busy life style of the modern people, frozen food has become extremely popular. It is worth mentioning that the present invention also improved the problem of the frozen product, especially for han-burger or the likes, that after being frozen for a while, the burger unit becomes undesirably soggy and tough.

It is appreciated that the filling 30 can be disposed into the filling compartment 11 after the heat is applied on the burger unit, and then frozen the han-burger with the filled filling 30 to form a frozen han-burger, so that the han-burger can be preserved for a relatively longer period and being easily served for the user by heating up the han-burger in a couple minutes. The filling 30 also can be individually or separately packed into the packing container 31 for separately freezing the burger unit and the filling 30.

As shown in FIG. 6, after the step (5) of covering the burger cover 20 at the top opening of the filling compartment 11, a step of packing the han-burger is further provided, wherein a packing box 60 is provided for packing the han-burger. The packing box 60 has a label 61 attached on a surface of the box for indicating and describing the han-burger, as long as some other information such as expired date and ingredient.

Figure 4:
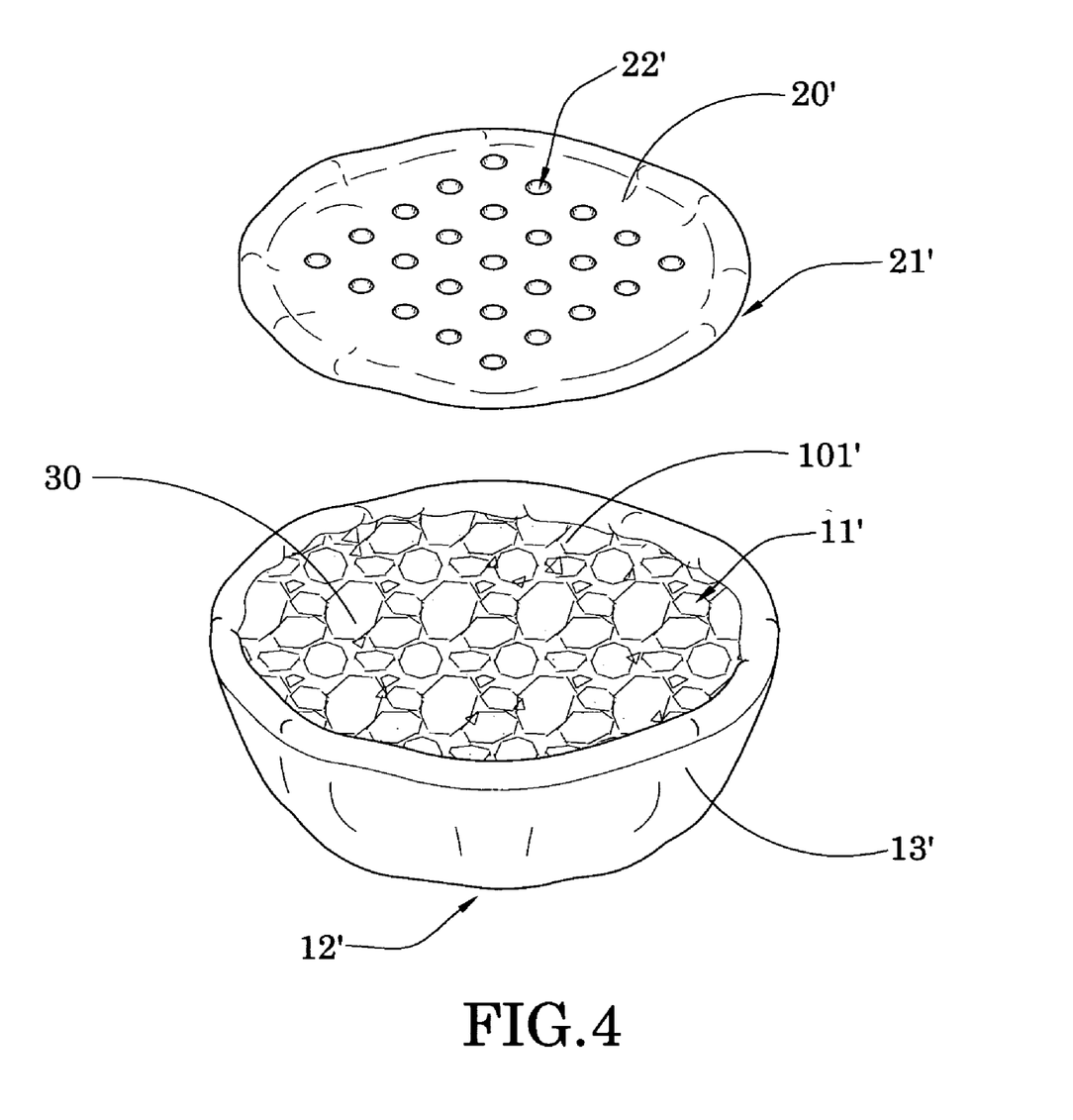
FIG. 4 is a perspective view of the han-burger with filling according to a second preferred embodiment of the present invention.
Figure 5:
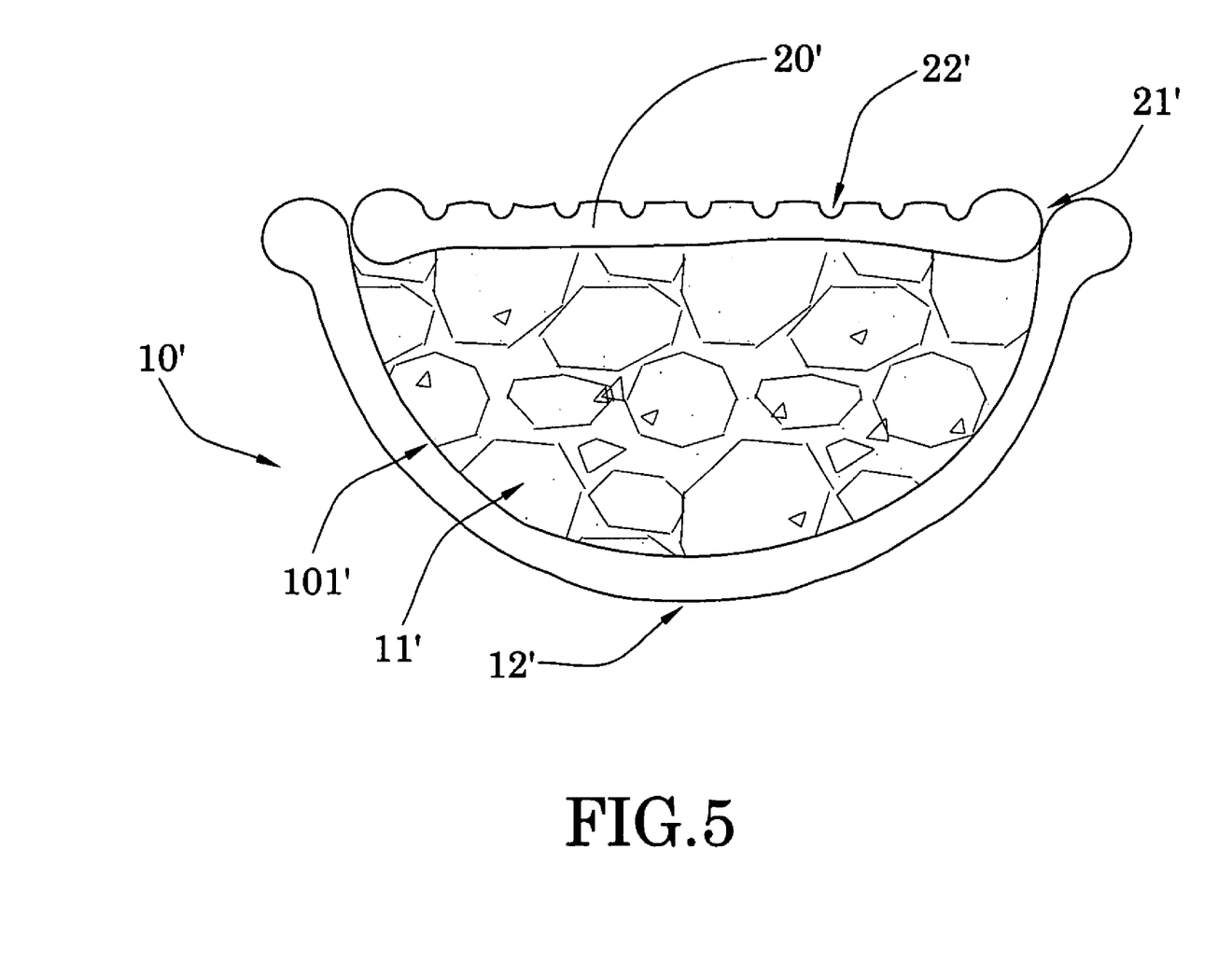
FIG. 5 is a sectional view of the han-burger with filling according to the above second preferred embodiment of the present invention.

Referring to FIGS. 4 and 5 of the drawings, an alternative burger unit of the han-burger according to the first preferred embodiment of the present invention is illustrated, wherein the burger unit comprises a burger shell 10' and a burger cover 20', and its manufacturing method thereof is the same as the first embodiment.

The burger shell 10' has a bottom wall 12' and a surrounding wall 13' inclinedly extended from the bottom wall 12' to define the filling compartment 11' therewithin, wherein the bottom wall 12' and the surrounding wall 13' are integrally formed an inner surface 101' of the burger shell 10' within the filling compartment 11' as the surrounding surface of the filling compartment 11'. As shown in FIG. 5, the burger shell 10' has a bowl shape that the inner surface 101' of the surrounding wall 13' is curved and inclinedly extended from the button wall 12' to form the bowl shape of the burger shell 10' and to define a filling compartment 11' therewithin, so as to form the enlarged top opening of the burger shell 10'.

The burger cover 20' has a circumferential edge 21' having a size and shape geographically matching a top opening of the filling compartment 11', so that the burger cover 20' is adapted for covering the filling compartment 11' of the burger shell 10' via contacting the circumferential edge 21' of the burger cover 20' with the inner surface 101' of the burger shell 10'. It is worth mentioning that the inclinedly extended bowl shape surrounding wall 13' is able to retain the burger cover 20' in a position at the top opening of the filling compartment 11', while the circumferential edge 21' of the burger cover 20' is contacting with the inner surface 101' of the surrounding wall 13' of the burger shell 10', so as to prevent the burger cover 20' downwardly sliding movement to fall into the filling compartment 11'.

A plurality of indented cavity 22' further provide on a top surface of the burger cover 20' for receiving and retaining a variety of sauce as the user desired, such that the user is able to add a flavor on the indented cavity 22' for flavoring the han-burger. The indented cavities 22' as embodied in the alternative burger unit of the first preferred embodiment of the present invention are a plurality of indentions downwardly and spacedly indented on the top surface of the burger cover 20', so that the holes of the indented cavities 22' of the burger cover 20' can retain the sauce thereon.

It is appreciated that the burger shell 10, 10', the burger cover 20, 20', and their alternatives can be interchanged to incorporate with each other, so that different combinations are provided for different uses.

It is appreciated that the manufacturer can only make and sell the burger unit only, such that the user is able to buy the burger unit and make the filling 30 by herself. In other words, the user is able to prepare a filling as the user desired ingredients and nutrition, and dispose the filling that the user prepared into the filling compartment 11 or 11' of the burger shell 10, or 10', and cover the burger cover 20, or 20' on the top opening of the filling compartment 11 or 11' of the burger shell 10, 10', which is heat-treated in advance.

Accordingly, the han-burger of the present invention provides a new way to have Chinese food for the consumer to eat Chinese food encased within the burger shell 10 and the burger cover 20. For example, most consumers will eat Chinese food "sweet and sour pork" with rice. However, the han-burger of the present invention provides an innovative way for the consumers to eat "sweet and sour pork" encased within the burger shell 10 and the burger cover 20. In addition, the consumer can enjoy eating the burger shell 10, burger cover 20, and the filling 30 therein at the same time as he or she is eating the Chinese food with rice.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of preparing a han-burger, comprising the steps of:

(a) providing a dough of said han-burger;
(b) shaping a first portion of said dough to form a burger shell having a filling compartment and a top opening, and a second portion of said dough to form a burger cover having a size and shape matching said top opening of said burger shell, wherein said burger shell has a bottom wall and a surrounding wall inclinedly extended from said bottom wall to define said filling compartment within said bottom wall and said surrounding wall;
(c) applying heat to said burger shell and said burger cover to retain the shapes thereof, wherein a surrounding surface of said filling compartment becomes harden to form a harden layer of said burger shell for moisture prevention of said burger shell;
(d) preparing a filling with predetermined ingredients and nutrition, wherein said filling is disposed in said filling compartment of said burger shell in such a manner that said harden layer of said burger shell contacts with said filling for preventing an undesirable soggy of said burger shell; and
(e) covering said burger cover at said top opening of said burger shell to encase said filling within said filling compartment at a position that said burger cover is frictionally engaged with said burger shell to retain said burger cover at said top opening of said burger shell, wherein said burger cover has a circumferential edge frictionally contacting with an inner side of said surrounding wall of said burger shell at said top opening to enclose said filling compartment, wherein in said step (c), said heat is further applied to said burger shell until said surrounding surface of said filling compartment becomes harden and is applied to said burger cover until an inner surface of said burger cover becomes harden to form a harden layer of said burger cover for contacting with said filing when said burger cover covers said filling compartment.

2. The method, as recited in claim 1, wherein in said step (b), said first portion of said dough is placed on a shell mold having a convex molding surface, in such a manner that when said first portion of said dough is heat-treated, said convex mold surface of said shell mold is adapted to retain the shape of said filling compartment of said burger shell.

3. The method, as recited in claim 2, wherein said step (b) further comprises a step of forming a plurality of indented cavities on said second portion of said dough such that said burger cover is heat-treated to retain the shapes of said indented cavities on a top surface of said burger cover.

4. The method, as recited in claim 1, wherein in said step (c), said burger shell and said burger cover are placed in an oven at a predetermined baking temperature for a predetermined baking time, until said burger shell and said burger cover become edible products.

5. The method, as recited in claim 2, wherein in said step (c), said burger shell and said burger cover are placed in an oven at a predetermined baking temperature for a predetermined baking time, until said burger shell and said burger cover become edible products.

6. The method, as recited in claim 3, wherein in said step (c), said burger shell and said burger cover are placed in an oven at a predetermined baking temperature for a predetermined baking time, until said burger shell and said burger cover become edible products.

7. The method, as recited in claim 4, wherein in said step (c), said burger shell and said burger cover are placed in a steam chamber at a predetermined cooking temperature for a predetermined cooking time, until said burger shell and said burger cover become edible products.

8. The method, as recited in claim 5, wherein in said step (c), said burger shell and said burger cover are placed in a steam chamber at a predetermined cooking temperature for a predetermined cooking time, until said burger shell and said burger cover become edible products.

9. The method, as recited in claim 6, wherein in said step (c), said burger shell and said burger cover are placed in a steam chamber at a predetermined cooking temperature for a predetermined cooking time, until said burger shell and said burger cover become edible products.

10. A han-burger, comprising:

a burger unit which comprises a burger shell having a filling compartment and a top opening, and a burger cover having a size and shape matching said top opening of said burger shell, wherein said burger shell has a harden layer formed at a surrounding surface of said filling compartment for moisture prevention of said burger shell, wherein said burger shell has a bottom wall and a surrounding wall inclinedly extended from said bottom wall to define said filling compartment within said bottom wall and said surrounding wall, wherein said burger cover also has a harden layer formed at an inner surface of said burger cover, wherein said burger cover further has a circumferential edge frictionally contacting with an inner side of said surrounding wall of said burger shell at said top opening to enclose said filling compartment; and a filling with predetermined ingredients and nutrition disposed in said filling compartment of said filling shell that said harden layers of said burger shell and said burger cover contact with said filling for preventing an undesirable soggy of said burger shell and said burger cover, wherein said burger cover is covered at said top opening of said burger shell to encase said filling within said filling compartment that said burger cover is frictionally engaged with said burger shell to retain said burger cover at said top opening of said burger shell, wherein said han-burger is prepared by a method comprising the steps of: (a) providing a dough of said burger unit; (b) shaping a first portion of said dough to form said burger shell having said filling compartment and said top opening, and a second portion of said dough to form said burger cover having a size and shape geographically matching said top opening of said burger shell; (c) applying heat to said burger shell and said burger cover to retain the shapes thereof; (d) preparing a filling with predetermined ingredients and nutrition, wherein said filling is disposed in said filling compartment of said filling shell; and (e) covering said burger cover at said top opening of said burger shell to enclose said filling within said filling compartment, wherein said surrounding surface of said filling compartment is hardened to form said harden layer thereof after said burger shell is further heat-treated, wherein said burger cover has a plurality of indented cavities formed on a top surface of said burger cover.

11. A han-burger, comprising:

a burger shell having a filling compartment and a top opening, wherein said burger shell has a bottom wall and a surrounding wall inclinedly extended from said bottom wall to define said filling compartment within said bottom wall and said surrounding wall for said filling disposing within said filling compartment, wherein said burger shell has a harden layer formed at a surrounding surface of said filling compartment for moisture prevention of said burger shell when said surrounding surface of said filling compartment contacts with said filling; and a burger cover having a size and shape matching said top opening of said burger shell, wherein said burger cover also has a harden layer formed at an inner surface of said burger cover for moisture prevention of said burger cover when said inner surface of said burger cover contacts with said filling, wherein said burger cover is covered at said top opening of said burger shell that said burger cover is frictionally engaged with said burger shell to retain said burger cover at said top opening of said burger shell for enclosing said filling within said filling compartment, wherein said burger cover has a circumferential edge frictionally contacting with an inner side of said surrounding wall of said burger shell at said top opening to enclose said filling compartment;

wherein said han-burger is prepared by a method comprising the steps of: (a) providing a dough of said burger unit; (b) shaping a first portion of said dough to form said burger shell having said filling compartment and said top opening, and a second portion of said dough to form said burger cover having a size and shape geographically matching said top opening of said burger shell; and (c) applying heat to said burger shell and said burger cover to retain the shapes thereof, wherein said filling is disposed in said filling compartment of said filling shell, wherein said burger cover is adapted to cover at said top opening of said burger shell for enclosing said filling within said filling compartment, wherein said surrounding surface of said filling compartment is hardened to form said harden layer thereof after said burger shell is further heat-treated, wherein said burger cover has a plurality of indented cavities formed on a top surface of said burger cover.

\* \* \* \* \*